Dec. 1, 1953
C. G. BURTON
2,660,927
PROJECTION SCREEN
Filed Dec. 12, 1949
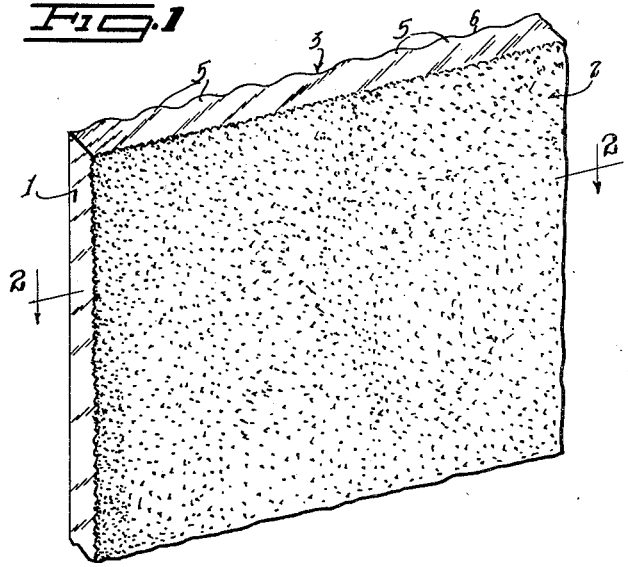
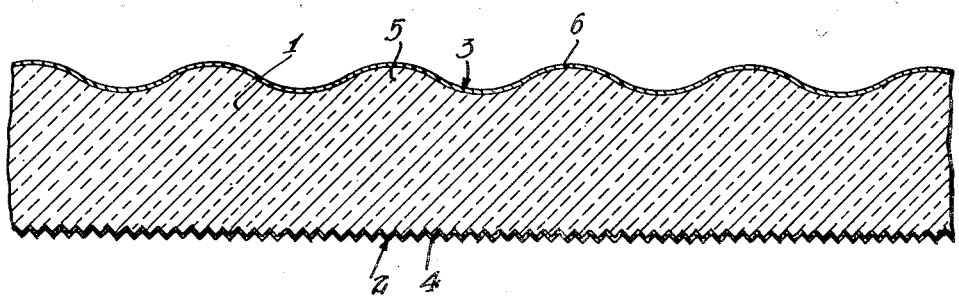
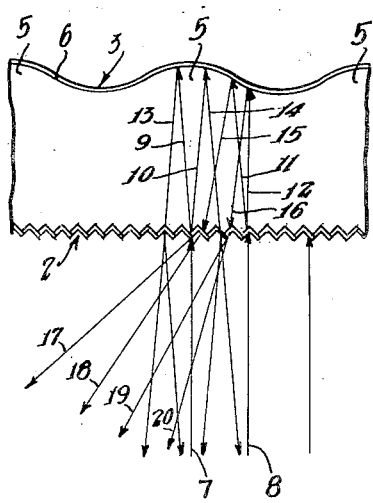
INVENTOR.
Charles G. Burton
BY Lyon & Lyon
ATTORNEYS.

Patented Dec. 1, 1953

2,660,927

UNITED STATES PATENT OFFICE 2,660,927

PROJECTION SCREEN

Charles G. Burton, San Diego, Calif.

Application December 12, 1949, Serial No. 132,515

2 Claims. (Cl. 88—28.9)

My invention relates to a projection screen, and more particularly to a projection screen of the reflecting or front-projection type for the purpose of projecting motion pictures, slide films, television images, and the like.

The principal objection to front-projection screens now available is that they require a darkened room for the showing of pictures. While this is not a very serious handicap in a public motion picture theater where darkness and air-conditioning are customarily present, it becomes a serious handicap in the many instances where pictures are shown in daytime to more or less crowded groups such as school and other educational classes, club groups and the like.

The principal reasons that presently available screens cannot be used in a lighted room are that they absorb some of the projected light, they reflect the projected picture in all directions from the screen, thus wasting a large part of the projected light by sending it up and down as well as toward the audience, and they collect and diffuse in all directions light coming from sources other than the projector, thus destroying the necessary contrast in the picture. This necessitates an artificial darkening of the room with consequent loss of ventilation, eyestrain, and inability of the audience to move around freely or to take notes. The process of artificially darkening a room is also quite expensive.

My invention consists of a screen which makes it possible to view clear, bright images from all parts of a normally lighted room in daytime. This is accomplished by using a clear piece of transparent material, such as glass, the back of which is formed into closely spaced ribs whose cross section approaches a sinusoidal curve, said ribs running vertically of the screen. These ribs are mirror-plated. The front surface is roughened sufficiently to remove the glaze and to form a refracting surface with very low reflective power. I have found that one way to produce this refracting surface is to sandblast said surface until all glaze is removed, and then to make it more nearly transparent by applying one or more very thin coats of varnish or other transparent film.

In the drawings:

Figure 1 is a perspective view of a portion of my screen.

Figure 2 is a cross section taken on the line 2—2 of Figure 1.

Figure 3 is a fragmentary section similar to Figure 2 showing the approximate paths of light rays entering the screen at various points.

A screen constructed in accordance with my invention has a base plate 1 of glass or other transparent material, forming a large square or rectangular viewing screen having a front surface 2 and a rear surface 3.

The front surface 2, which is the viewing surface, is treated to cause it to slightly refract light projected upon it. In the preferred form of my invention the front surface 2 is substantially flat but roughened slightly by sandblasting and it is then given a coat of varnish or other transparent film. This coating is extremely thin and in the preferred embodiment of my invention the coating of varnish 4 upon the roughened surface 2 is formed by painting or spraying and then removing as much as possible with a dry cloth before the varnish sets.

The rear surface 3 of the screen is formed to have a sinusoidal curved surface to form ribs 5 running vertically of the screen. These ribs are then given a mirror coating 6.

The operation of my screen is shown in Figure 3. Beams of light 7 and 8 from the projector enter the front surface 2 where they are slightly refracted as shown by the ray lines 9, 10 and 11, 12, respectively. This light passes through the plate 1 of transparent material and strikes the mirrored surface 3. The light is then reflected back toward the front surface of the screen where it is refracted still more and emerges from the screen to reach the eyes of the audience. The beams of light 9 and 10 strike a portion of a rib 5 at a point where the rib is substantially parallel to the front surface of the screen and will be reflected back toward the projector as shown by the lines 13 and 14. The beams of light 11 and 12, striking the rib 5 on the curved surface at an angle to the front surface 2, will be reflected largely to one side as shown by the light lines 15 and 16 and will be further refracted in the same direction as they leave the front surface of the screen as shown by the lines 17, 18, 19 and 20.

Very little of the projected beam, however, is reflected or refracted to any point above or below the screen as the sinusoidal ribbed surface has the ribs only running in a vertical plane. Thus, the projected light coming from the screen is confined to an area normally occupied by the audience and is not wasted in an up and down direction as in conventional screens.

The smallest detail that is visible in any projected image that is viewed on this screen must be wider than any single rib; thus each detail is reflected to every part of the audience. Therefore, the distance between ribs regulates the smallest image that can be seen from my screen. I have found that the number of ribs 5 required per inch of screen width is determined by the minimum viewing distance of the audience. Where some members of the audience may be as close as four feet to the screen, fifteen or more ribs 5 to the inch are required. At a minimum distance of twenty feet, three ribs 5 or more per inch are required, while on larger screens where the audience is at a greater minimum distance from the screen, proportionally fewer ribs 5 per inch are required.

With my screen a brilliant image may be viewed anywhere within an arc of 160° around the front of the screen. Also, distortion of the image when viewed from one side or the other is reduced greatly as compared to distortion of conventional screens.

While it is necessary that the ribs 5 be of a uniform shape on any one screen to avoid streaks or distortion of the images, it is possible to vary this shape for specific effects. Lengthening the curve on one side of the ribs will result in throwing the image to one side of the screen.

I have found that in order to obtain the greatest brilliance of the image without reducing the viewing angle to less than 160°, the ratio of the depth of the ribs to the width of one complete rib must be approximately 1 to 10. Increasing the depth of the rib in proportion to the length will result in a less brilliant image. Decreasing the depth of the rib in proportion to the width will result in a brighter image but will limit this area of brilliance to a smaller arc in front of the screen.

The thickness of the plate 1 is also important since too great a thickness will result in greater refraction of each individual beam as it passes through the front of the glass, thus resulting in a fuzzy image. It is a well known fact in optics that there is no such thing as a truly sharp definition in a projected image, but the limitations of the human eye make this unnecessary. I have found that where the minimum viewing distance is four feet, apparent sharpness of the image is obtained on the transparent plate 1 of not over three-sixteenths of an inch in thickness, while at a minimum viewing distance of twenty feet not over one-fourth of an inch of thickness may be used, while at greater minimum viewing distances a thicker material may be used.

Use of the ribbed reflecting surface 3 without the front refracting surface 2 does not produce a complete image since it does not reflect light from every part of the screen to each individual in the audience. Use of the refracting surface 2 alone results in a dim image with little contrast, not suitable for showing in a normally lighted room. Use of the refracting surface 2 with a planar reflecting surface 3 results in reflecting a bright image to the area immediately around the projector, but does not give a wide enough viewing angle to be of practical use.

While I have described the preferred embodiments of my invention, it is to be understood that I do not wish to be limited to the details herein set forth, but my invention is of the full scope of the appended claims.

I claim:

1. In a viewing screen, a sheet of transparent material having a front surface and a rear surface, said front surface being substantially flat, said front surface being slightly and uniformly roughened and having a thin coat of transparent material thereon to render the front surface transluscent, said rear surface having parallel regularly spaced vertical ribs, each rib being continuous and of uniform cross-sectional shape from top to bottom of the screen, said ribs being shaped to form sinusoidal curves, said rear surface having a reflective coating, whereby substantially all light entering said screen is reflected forwardly and horizontally laterally of the screen and loss by reflection upwardly and downwardly is minimized.

2. In a viewing screen, a sheet of glass having a front surface and a rear surface, said front surface being substantially flat, said front surface having a rough surface of the type produced by light sandblasting and having a coat of varnish thereon to render the front surface transluscent, the roughened surface having myriad high and low points, and said coat of varnish being extremely thin on said high points and only slightly thicker at said low points, said rear surface having parallel regularly spaced vertical ribs, each rib being continuous and of uniform cross-sectional shape from top to bottom of the screen, said ribs being shaped to form sinusoidal curves, said rear surface having a reflective coating, whereby substantially all light entering said screen is reflected forwardly and horizontally laterally of the screen and loss by reflection upwardly and downwardly is minimized.

CHARLES G. BURTON.

References Cited in the file of this patent

UNITED STATES PATENTS

| Number | Name | Date |
|---|---|---|
| 1,044,135 | Buechner | Nov. 12, 1912 |
| 1,491,830 | Troeger | Apr. 29, 1924 |
| 1,535,985 | Clark | Apr. 28, 1925 |
| 2,086,556 | Jacobson | July 13, 1937 |
| 2,480,031 | Kellogg | Aug. 23, 1949 |